C. L. BROWN.
TRANSMISSION AND AUTOMATIC CLUTCH CONTROL MECHANISM.
APPLICATION FILED JAN. 18, 1918.

1,299,293.

Patented Apr. 1, 1919.

Inventor
C. L. Brown

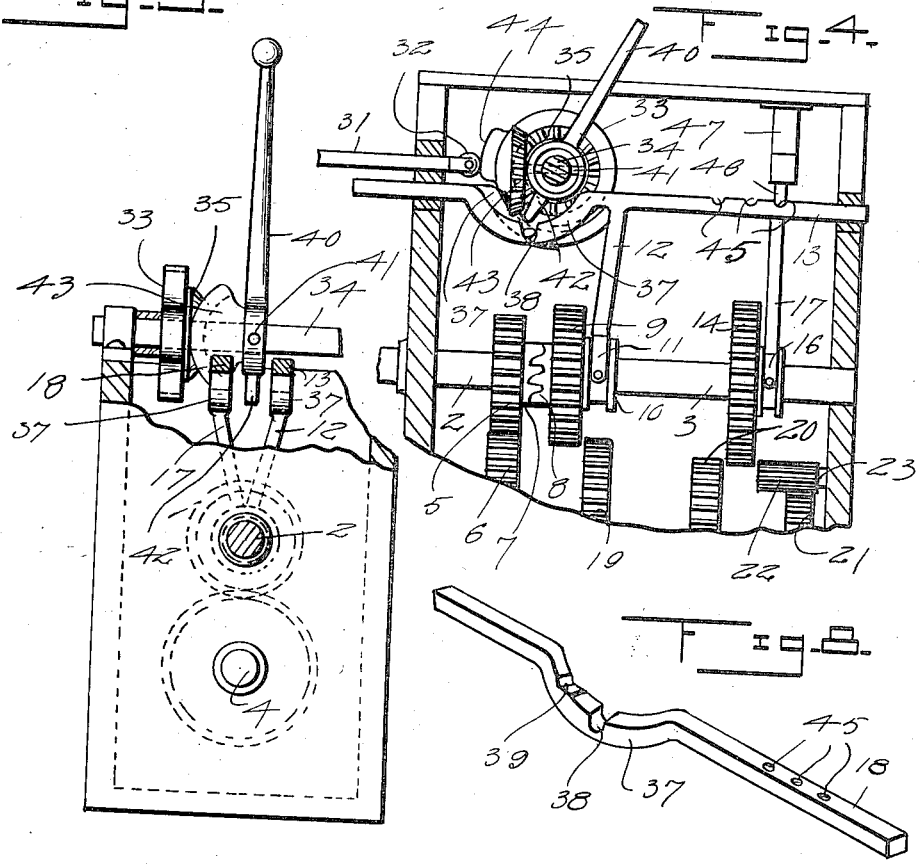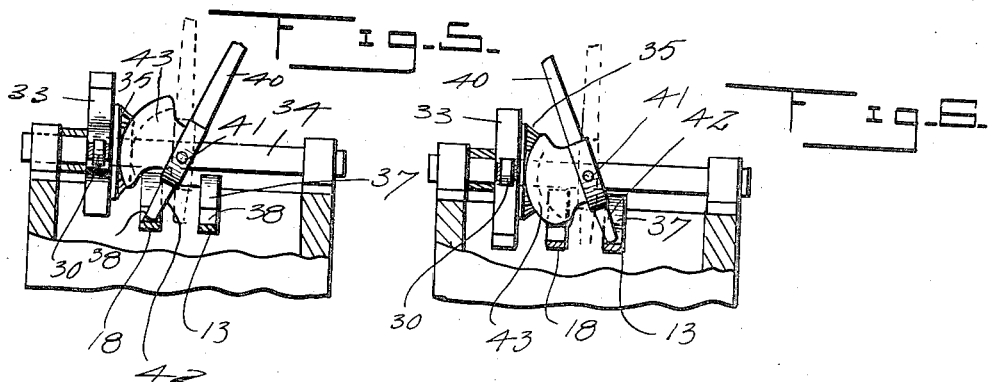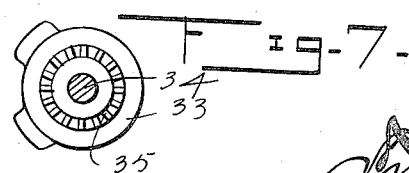

UNITED STATES PATENT OFFICE.

CHARLEY LUTHER BROWN, OF CHANDLER, OKLAHOMA.

TRANSMISSION AND AUTOMATIC CLUTCH-CONTROL MECHANISM.

1,299,293.     Specification of Letters Patent.     Patented Apr. 1, 1919.

Application filed January 18, 1918. Serial No. 212,469.

*To all whom it may concern:*

Be it known that I, CHARLEY LUTHER BROWN, a citizen of the United States, residing at Chandler, in the county of Oklahoma and State of Oklahoma, have invented certain new and useful Improvements in Transmission and Automatic Clutch-Control Mechanism; and I do hereby declare the following to be a full, clear, and exact description of the invention, such as will enable others skilled in the art to which it appertains to make and use the same.

This invention relates to improvements in transmission and automatic clutch control mechanism and has for one of its objects the provision of a device of this character whereby, in the shifting from one speed or gear to another, the danger of stripping the teeth of the gears will be obviated.

Another object of this invention is the provision of means controlled by the shifting lever of the transmission mechanism that will automatically disengage or render the clutch inoperative prior to the movement of the gears thereby obviating the stripping of the teeth thereof.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Fig. 3 is a transverse sectional view illustrating the means for actuating the clutch by the controlling lever of the transmission.

Fig. 4 is a fragmentary vertical sectional view of the same,

Fig. 5 is a fragmentary sectional view illustrating the shifting lever moved laterally in one direction, Fig. 6 is a similar view illustrating the shifting lever moved laterally in an opposite direction, Fig. 7 is a detail view partly in section of the cam.

Fig. 8 is a perspective view of one of the shifting rods.

Figure 1:
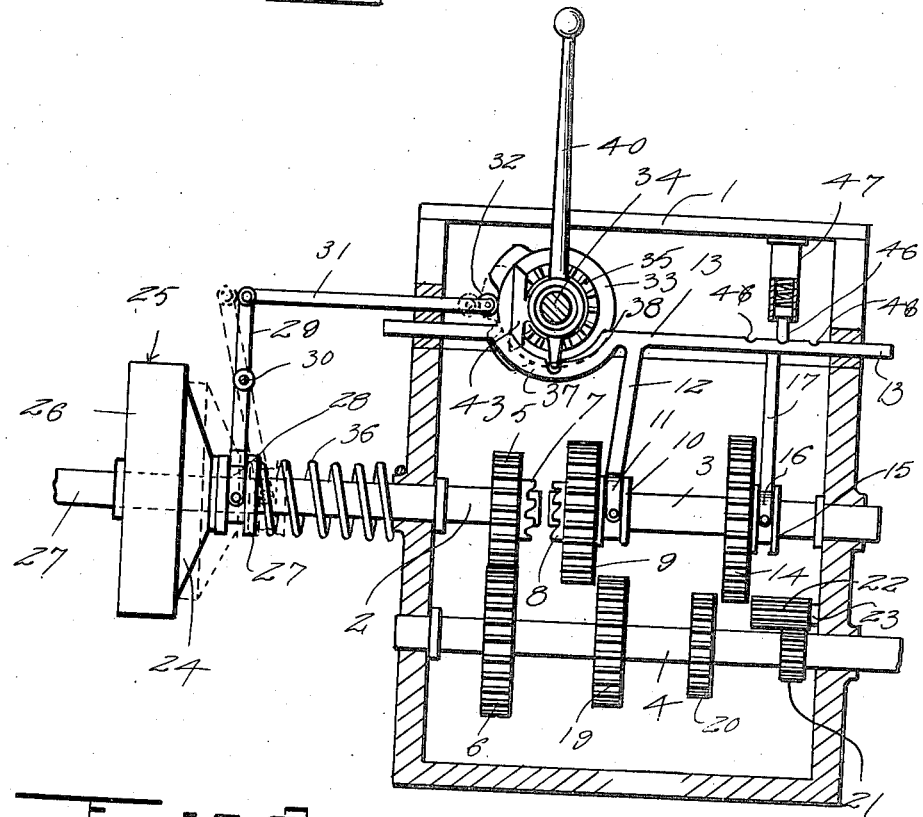
Figure 1 is a vertical sectional view of a transmission and automatic clutch control constructed in accordance with my invention.
Figure 2:
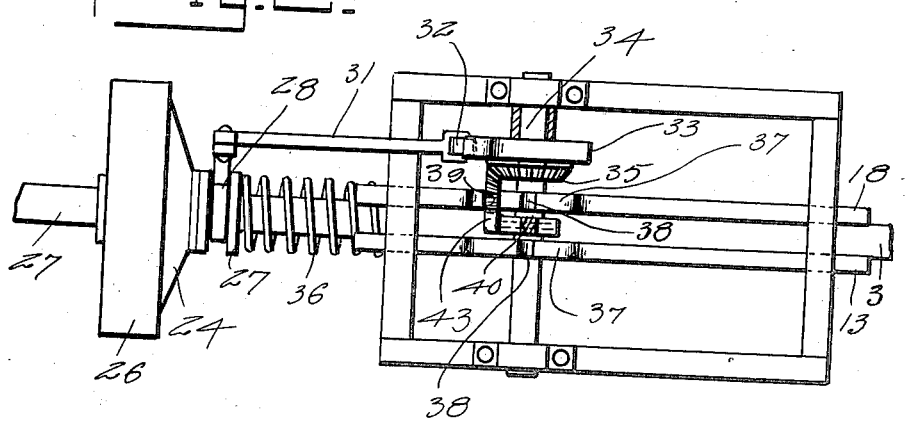
Fig. 2 is a longitudinal sectional view of the same.

Referring in detail to the drawings, the numeral 1 indicates a transmission casing or housing of any desired construction and in which is journaled a drive shaft 2, a driven shaft 3, a counter shaft 4. The drive shaft 2 has secured thereto a gear 5 which meshes with a gear 6 secured to the counter shaft 4. The gear 5 has formed thereon a clutch element 7 which is adapted to be engaged by a clutch element 8 carried by a gear 9 that is splined to the driven shaft 3 when it is desired to obtain direct or high speed of the transmission mechanism as the drive shaft 2 will be directly coupled to the driven shaft 3. The gear 9 has formed thereon a grooved member 10 which is engaged by a fork 11 carried by an arm 12. The arm 12 is formed integrally with the shifting rod 13. The gear 14 is splined to the driven shaft 3 and has formed thereon a grooved member 15 which is engaged by a fork 16 carried by an arm 17. The arm 17 is formed integrally with a shifting rod 18. A gear 19 of smaller dimensions than the gear 6 is secured to the counter shaft 4 and is adapted to be engaged by the gear 9 to obtain second or intermediate speed of the transmission mechanism. A gear 20 of smaller dimension than the gear 19 is secured to the counter shaft 4 and is adapted to be engaged by the gear 14 to obtain low or first speed of the transmission mechanism. A gear 21 of smaller dimension than the gear 20 is secured to the counter shaft and meshes with the pinion 22 carried by a stub shaft 23. The stub shaft 23 is secured to the casing or housing 1 in any well known manner so as to support the pinion 22 in a position to be engaged by the gear 14 so as to obtain reverse of the transmission mechanism. The foregoing description relates to a well-known type of selective transmission mechanism and to which my invention is applied.

The drive shaft 2 has splined thereto the ordinary male element 24 of a clutch 25, while the female element 26 is secured to the crank or driving shaft 27 of the prime mover, (not shown). The male clutch element 24 of the clutch 25 has formed thereon a grooved member 27 which is engaged by a fork 28 and by an arm 29. The arm 29 is pivotally mounted as illustrated at 30 and has pivoted to its upper end a rod 31. The rod 31 is slidably mounted in the front wall of the transmission housing or casing and has journaled to its free end a roller 32 adapted to engage a cam wheel 33. The cam wheel 33 is mounted on a stub shaft 34 which is journaled in suitable bearings carried by the housing or casing 1. The stub shaft 34 has mounted thereon a pinion 35 which is adapted to be actuated by controlling means which will be hereinafter more fully described. The male element 24 of the clutch 25 is normally urged in engagement with the female clutch element 26 by means of a coil spring 36.

The shifting rods 13 and 18 are slidably mounted in the front and rear walls of the housing or casing 1 and are each provided with an arcuate shaped offset portion 37 which has a notch 38 and 39. A shifting lever 40 is pivoted to the stub shaft 34 by means of a pin 41 for lateral movement in relation to the shifting rods 13 and 18. The controlling lever 40 has formed thereon an extension 42 which normally depends downwardly between the offset portions 37 of the shifting rods 13 and 18 as illustrated in dotted lines in Figs. 5 and 6. A segment 43 is formed upon the controlling lever 40 at its pivot point and meshes with the pinion 35. The rod 18 is provided with a notch 39 to receive the segment 43 to permit the same and said rod to have free movement without interfering with each other. The cam wheel 33 has formed thereon spaced cam portions 44 which are adapted to move into engagement with the roller on the rod 31 upon rotation of the pinion 35 by moving the controlling lever 40 laterally. The normal position of the controlling lever 40 is shown in Fig. 3 and in dotted lines in Figs. 5 and 6 so that the extension 42 depends downwardly between the shifting rods 13 and 18. By moving the controlling lever 40 laterally in the direction as illustrated in Fig. 5, the extension 42 is moved into the notch 38 of the offset portion 37 of the shifting rod 18, and when making this movement, the segment 43 rotates the pinion 35 which imparts rotation to the cam wheel 33 causing one of the cam portions 44 to engage the roller 32 thereby moving the rod 31 forwardly which rocks the arm 29 on its pivot disengaging the male element 24 from the female element 26 of the clutch 25. The controlling lever 40 is then moved rearwardly causing the gear 14 to mesh with the gear 20 to obtain first or low speed to the transmission mechanism. As the gear 14 moves into mesh with the gear 20, the extension 42 moves out of the notch 38 of the shifting rod 18 and by a slight further movement of the controlling rod in the same direction the cam portions pass the roller permitting the arm 29 and rod 31 to return to their initial position and also the clutch elements into engagement with each other under the influence of the spring 36.

In order to obtain reverse of the transmission mechanism, the controlling lever 40 is moved forwardly with the extension 42 in engagement with the notch 38 of the shifting rod 18, the clutch being already disengaged or rendered inoperative owing to the shifting lever being moved laterally as illustrated in full lines in Fig. 5 making the process of disengaging the clutch identical with that heretofore described when obtaining first or low speed to the transmission mechanism.

To obtain intermediate or second speed of the transmission mechanism, the controlling lever 40 is moved laterally to a position illustrated in full lines in Fig. 6 positioning the extension in the notch of the shifting rod 13. Upon this movement, the cam wheel 33 is rotated moving the other cam portion 44 into engagement with the roller upon the rod 31 which causes the clutch to be rendered inoperative. The controlling lever 40 is then moved forwardly moving the shifting rod 13 rearwardly connecting the gears 9 and 19 thereby obtaining intermediate or second speed. As the gears 9 and 19 become meshed, the cam 44 just mentioned passes beyond the roller permitting the rod 31 to move rearwardly thereby permitting the male element 24 to move in engagement with the female element 26 of the clutch 25, thus introducing a driving power from the drive shaft 2 through the counter shaft 4 to the driven shaft 3 by way of the gears 9 and 19. To obtain high or direct drive of the transmission mechanism, the shifting lever is moved laterally in the direction illustrated in Fig. 6 positioning the extension 42 in the notch 38 which causes the clutch to be rendered inoperative and upon rearward movement of the controlling lever the clutch element 8 is moved into engagement with the clutch element 7, thus obtaining a direct drive from the driven shaft 2 to the driven shaft 3. As the clutch element 8 engages the clutch element 7 the cam passes beyond the roller 32 permitting the rod 31 to return to its initial position as well as permitting the male element 24 to engage the female element 26 of the clutch 25. When any of the gears have moved into an engagement with each other by movement of the controlling lever 40, the extension 42 passes outwardly of either of the notches 38 of the rods 13 and 18 so that the controlling lever can be moved a slight distance so that either of the cams 44 will be disengaged from the roller 32.

Each of the shifting rods 13 and 18 is provided with three notches 45 which are adapted to be engaged by spring actuated plungers 46 mounted in casings 47 carried by the housing or transmission casing 1. These spring plungers 46 are adapted to engage the notches 45 for the purpose of holding the shifting rods either in their operative or inoperative position.

While I have shown and described the preferred embodiment of my invention, it will be understood that minor changes in construction, combination, and arrangement of parts may be made without departing from the spirit and scope of the invention as claimed.

What I claim is:—

1. The combination with a clutch and a transmission mechanism including a plurality of speed changing gears, of a pivotally mounted controlling lever, shifting rods slidably mounted and connected to the gears, said rods having arcuate shaped offset portions provided with notches, an extension formed on the shifting lever and adapted to engage either of the notches upon lateral movement of the shifting lever, and means disengaging the clutch upon lateral movement of the lever and permitting engagement of the clutch after the forward and rearward movement of the lever.

2. The combination with a clutch and a transmission mechanism including a plurality of speed changing gears, of a pivotally mounted controlling lever, shifting rods slidably mounted and connected to the gears and having offset portions provided with notches, an exension formed on the shifting lever and adapted to move into either of the notches upon lateral movement of the lever so that the shifting rods may be moved upon forward or rearward movement of the shifting lever, and means disengaging the clutch upon lateral movement of the lever and permitting engagement of the clutch after the lever has been moved forwardly or rearwardly to obtain the various speeds to the transmission.

3. The combination with a clutch and a transmission mechanism including a casing and a plurality of speed changing gears, of a stub shaft secured in the casing, a controlling lever pivotally mounted on said shaft, an extension formed on said controlling lever, shifting rods slidably mounted in said casing and connected to the gears, offset portions formed on said shifting rods and having notches adapted to receive the extension upon lateral movement of the lever so that upon forward or rearward movement of the lever the shifting rods will be slid in the casing, a cam wheel on said shaft, spaced cam portions on said cam wheel, a rod slidable in said casing, a roller secured to the second named rod and in engagement with the cam wheel, means connecting the second named rod with the clutch, a pinion connected to the cam wheel, and a segment on the controlling lever and in mesh with the pinion for engaging and disengaging the clutch upon forward and rearward movement and lateral movement respectively of the lever.

In testimony whereof I affix my signature in presence of two witnesses.

CHARLEY LUTHER BROWN.

Witnesses:
I. N. HALL,
W. B. BROWN.